(No Model.)
P. M. MISHLER.
HEDGE.
No. 411,464. Patented Sept. 24, 1889.
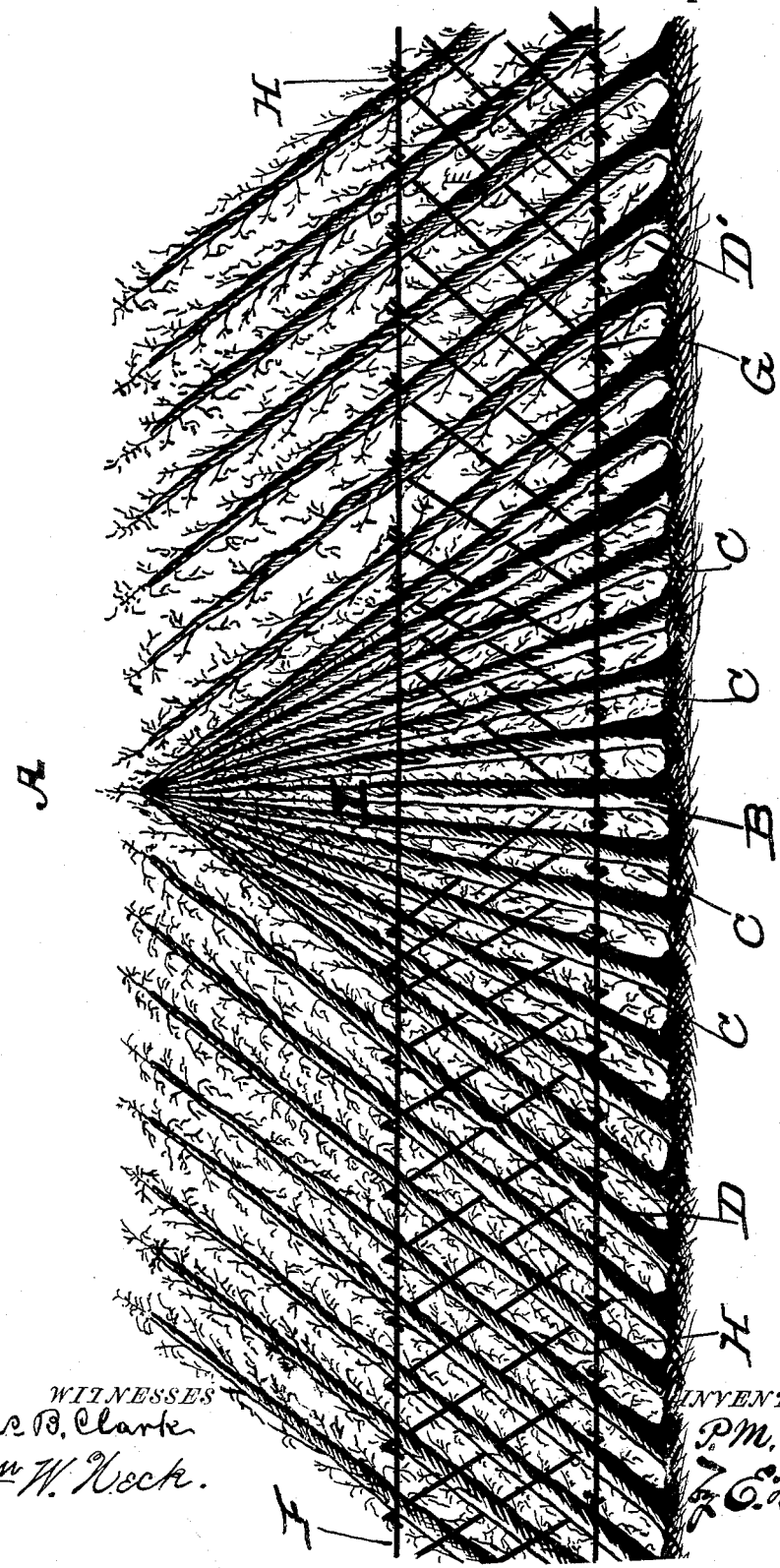
WITNESSES
Jas. B. Clarke
Wm. W. Neck.
INVENTOR
P. M. Mishler
by E. H. Bates
Attorney.

UNITED STATES PATENT OFFICE.

PHARES M. MISHLER, OF HAGERSTOWN, MARYLAND.

HEDGE.

SPECIFICATION forming part of Letters Patent No. 411,464, dated September 24, 1889.

Application filed May 29, 1889. Serial No. 312,641. (No model.)

*To all whom it may concern:*

Be it known that I, PHARES M. MISHLER, a citizen of the United States, residing at Hagerstown, in the county of Washington and State of Maryland, have invented certain new and useful Improvements in Hedges; and I do hereby declare the following to be a full, clear, and exact description of the invention, such as will enable others skilled in the art to which it appertains to make and use the same.

This invention relates to an improvement in what are known as "hedge" or "living" fences, which are usually made of the osage orange, but which may be made of other plants or bushes; and the object of my improvement is to train in a novel manner the growing stalks arranged in right and left inclined positions toward a central stalk or stalks, and providing horizontal wires and diagonal tie-wires for retaining the stalks in their inclined position, whereby a substantial fence is produced, and enabling me to dispense with all posts, stakes, and the like which heretofore have been required to sustain a hedge. These posts, stakes, &c., used with hedges become loose in the ground when the latter becomes soft or wet, and give to such an extent that the hedge is not retained, and I by this invention so construct a hedge that under all circumstances the same is self-sustaining.

I attain my object by the means illustrated in the annexed drawing, in which the figure represents a side elevation of a section of my improved hedge fence, showing clearly the manner in which the same is constructed.

Referring by letter to the accompanying drawing, A designates a short section of my improved hedge fence, composed of living or growing stalks of the osage orange or other suitable plant.

B indicates a central upright stalk; or, if preferred, several of the stalks near this one can be left in a perpendicular position; and C C', stalks which are in close relation thereto, and which are inclined in opposite directions, forming a central section I, thus forming a compound triangular braced and bracing section for the fence, which affords great strength to resist longitudinal strain or strain in the direction of the line of fence. On opposite sides of this triangular section I arrange hedge stalks D D', all of which are inclined toward the central section, as indicated in the annexed drawing. The stalks D are therefore inclined to the right and the stalks opposite thereto are inclined to the left. In order to hold these stalks in their inclined position, I provide a horizontal fence-wire G, arranged near the ground or roots of the stalks, and also a similar wire F, running parallel to the wire G and located about midway between the ground and the tops of the stalks. These two horizontal wires are carried the same side of the stalks, and are attached to the latter by smaller tie-wires H, which are looped around the wire F in front of a stalk and around the wire G in rear of said stalk. These horizontal and diagonal wires I use in combination with my improved hedge, the object of the latter being to unite the two horizontal wires and re-enforce the lower part of the fence, and firmly holding the stalks in an inclined position. These wires H are inclined in an opposite direction to the inclination of the stalks D D', as shown in the drawing, and when thus connected to the line-wires form a loop for the stalks, allowing the same to grow freely and without binding said stalks to the wires.

It will be seen from the above description that I arrange the several parts constituting the fence in such a manner that backward action or pressure of the stalks will draw one half of the fence-section against the other half or section, and thus by such construction I dispense with the use of posts, stakes, or other supports usually employed in sustaining hedges heretofore, and by this method of training the hedge plants, as shown in the drawing, I am enabled to erect a fence at a small cost, and it is durable and ornamental.

Having thus described my invention, what I claim, and desire to secure by Letters Patent, is—

The within-described hedge fence, consisting of the central triangular section formed of inclined stalks, in combination with the stalks D D', inclined toward said central section, the two horizontal wires, and the diagonal tie-wires looped to said horizontal wires, all as shown and described.

In testimony whereof I affix my signature in presence of two witnesses.

PHARES M. MISHLER.

Witnesses:
D. B. MYERS,
G. T. GATRELL.